(12) United States Patent
Jones

(10) Patent No.: US 6,401,144 B1
(45) Date of Patent: Jun. 4, 2002

(54) METHOD AND APPARATUS FOR MANAGING DATA TRANSFERS BETWEEN PERIPHERAL DEVICES BY ENCODING A START CODE IN A LINE OF DATA TO INITIATE THE DATA TRANSFERS

(75) Inventor: Morris Jones, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/259,249

(22) Filed: Feb. 26, 1999

(51) Int. Cl.[7] .................. G06F 13/00; G06F 15/00; G06F 9/30
(52) U.S. Cl. .................. 710/33; 710/56; 710/5; 712/24; 712/213; 712/210; 712/240; 712/201; 712/300
(58) Field of Search ................ 710/5, 33, 56; 712/24, 213, 240, 300, 208, 210; 711/212

(56) References Cited

U.S. PATENT DOCUMENTS

| | | | |
|---|---|---|---|
| 4,292,667 A | 9/1981 | Catiller et al. ............ 712/300 |
| 4,843,544 A | 6/1989 | DuLac et al. .............. 710/53 |
| 4,849,747 A | 7/1989 | Ogawa et al. ............ 345/467 |
| 4,864,495 A | * 9/1989 | Inaba ...................... 710/56 |
| 4,875,196 A | 10/1989 | Spaderna et al. ......... 365/238 |
| 5,664,135 A | * 9/1997 | Schlansker et al. ....... 712/201 |
| 5,867,699 A | * 2/1999 | Kuslak et al. ............ 712/240 |
| 5,881,260 A | * 3/1999 | Raje et al. ............... 712/210 |
| 6,275,927 B2 | * 8/2001 | Roberts .................. 712/213 |

* cited by examiner

*Primary Examiner*—Thomas Lee
*Assistant Examiner*—Tammara Peyton
(74) *Attorney, Agent, or Firm*—Thelen Reid & Priest LLP; David B. Ritchie

(57) ABSTRACT

A method and apparatus for ensuring that information transfers from memory to a peripheral device are complete prior to the peripheral device executing instructions responsive to the content of the information is described. The method includes identifying lines of data to be written, determining a unique start code to be used for that data, and embedding that start code into that data. When the proper number of lines of data have arrived in peripheral device memory, the pending operation is executed.

13 Claims, 4 Drawing Sheets

ROW 8 BYTE 3 AND ROW 16 BYTE 3

METHOD AND APPARATUS FOR MANAGING DATA TRANSFERS BETWEEN PERIPHERAL DEVICES BY ENCODING A START CODE IN A LINE OF DATA TO INITIATE THE DATA TRANSFERS

BACKGROUND OF THE INVENTION

1. Field of the Invention

This invention relates to the field of memory contained within Central Processing Unit (CPU) architecture. More particularly, the present invention describes a method and apparatus which ensures that transfers of data from different CPU memory locations to a peripheral device are completed prior to the peripheral device operating on the transferred data.

2. The Background Art

The total memory space available within which a CPU may read or write is typically assigned to a number of external and internal devices of different types. The characteristics of a given device determine how the processor interfaces with that device and the memory space associated with that device. Failure to follow the rules associated with a particular device and the associated memory space, often results in improper operation.

For example, within CPU's found in many computers today such as a Pentium Pro, there exists a set of registers that platform-specific software, e.g. Basic Input-Output System, Hardware Abstraction Layer, etc. sets up to define the rules within which segments of memory will be operated.

Designated the Memory Type and Range Registers (MTRR), these registers are set up during a boot cycle to define the various regions of memory available, and how the processor core instruction set and memory caches should behave when accessing each region for a read or write operation.

In computers having a Pentium Pro CPU, memory regions may be defined at startup as one of five types, namely Uncacheable memory (UC), Write Combining (WC) memory, Write Through (WT) memory, Write Protect (WP) memory, and Write Back (WB) memory.

Data written into WC memory is stored as it arrives, in lines of 32-bytes each. However, when the time comes for transmitting the data out of cache memory to the peripheral device, the data may leave the WC memory in a different order. The arrival of a second set of data at the peripheral device prior to a first set of data arriving may trigger operations within the peripheral device to begin prior to receipt of necessary data within the first set of data being received. Unintended results often follow, including the possibility of a failed operation.

It would therefore be beneficial to provide a method and apparatus for ensuring that all required data has been received by a peripheral device prior to performing operations requiring that data.

SUMMARY OF THE INVENTION

A method and apparatus for ensuring that information transfers from memory to a peripheral device are complete prior to the peripheral device executing instructions responsive to the content of the information is described. The method includes identifying lines of data to be written, determining a unique start code to be used for that data, and embedding that start code into that data. When the proper number of lines of data have arrived in peripheral device memory, the pending operation is executed.

DESCRIPTION OF ONE EMBODIMENT

Those of ordinary skill in the art will realize that the following description of the present invention is illustrative only and is not intended to be in any way limiting. Other embodiments of the invention will readily suggest themselves to such skilled persons from an examination of this disclosure.

This disclosure is focused on the details of performing high-speed write operations using a non-cacheable line storage mechanism. WC memory is well suited for these operations. Because the present invention is primarily directed towards solving problems particularly associated with WC memory, the other four types of memory will not be further discussed, in order to avoid overcomplicating the disclosure. It will be apparent to those of ordinary skill in the art, however, that the present invention may be practiced with many different memory types. Persons having ordinary skill in the art will readily recognize that the present invention is not restricted to memory designed into a processor. Rather, the present invention may be utilized whenever data is transferred from one or more locations into a device, in order to ensure that all of the data arrives prior to the device executing operations requiring that data.

Figure 1:
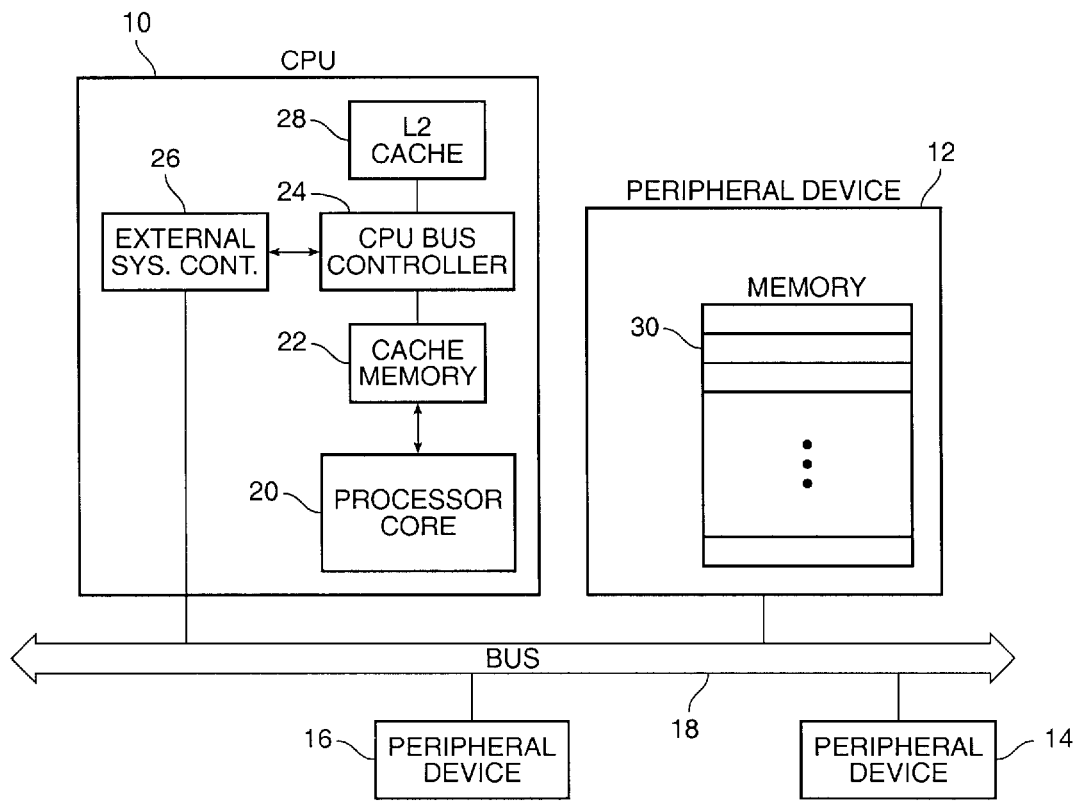
FIG. 1 is a simplified block diagram of a data processing system suitable for use with the present invention.

FIG. 1 is a simplified block diagram of a data processing system suitable for use with the present invention.

Referring to FIG. 1, a processor 10 and peripheral devices 12, 14, and 16, all communicate through bus 18. Processor 10 may comprise many subassemblies, such as a processor core 20 wherein instructions are executed, cache memory 22, CPU bus controller 24, external bus controller 26, and L2 cache memory 28. The exact construction of a processor utilizing the present invention is not critical.

Peripheral devices 12, 14, and 16 represent any device which communicates with processor 10 through bus 18, such as a video card, an audio card, a SCSI controller, or a modem. Peripheral device 12 represents a device such as a video controller which comprises memory 30 which is used by peripheral device 12 to perform tasks. The present invention is provided to ensure that an entire needed set of data has arrived in memory from cache memory 22, prior to peripheral device 12 performing operations which depend on the correct data being present in peripheral device memory 30.

Figure 2:
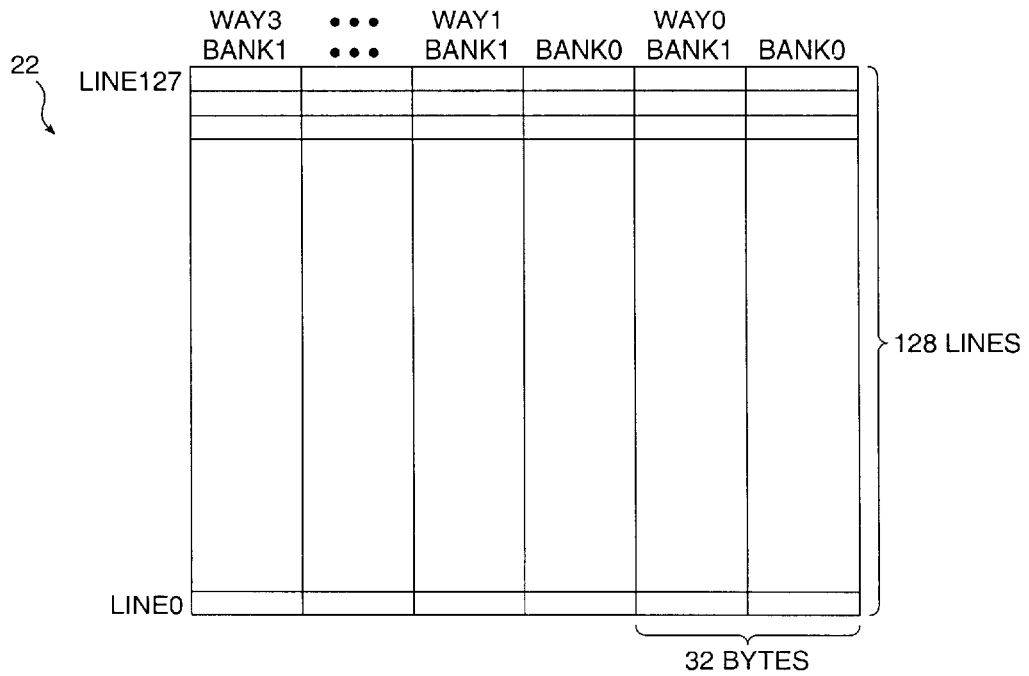
FIG. 2 is a block diagram representing one possible structure of cache memory within the processor depicted in FIG. 1.

FIG. 2 is a block diagram representing one possible structure of cache memory within the processor depicted in FIG. 1.

Referring to FIG. 2, cache memory 22 is typically divided into several sections of equal size. In the example given, cache memory 22 is divided into four pages, namely way 0, way 1, way 2, and way 3, each having 128 lines of 32 bytes each. Data is typically stored on a first-come first-served basis, filling memory from line 0 to line 127 in each page. The processor will handle all transactions with one page of memory, and then move to a different page, handling all of the transactions with the second page, and so on. Because it is possible for data to arrive in way 2 prior to other data arriving in way 1, it is possible for later arriving data in way 1 to be transferred to the peripheral device prior to the transfer of earlier arriving data in way 2.

For example, data group "A", relating to peripheral device 12 (FIG. 1) might be handled and then stored by the processor in way 0, banks 0 and 1, of cache memory 22. Data group "B" might then be handled and stored in way 1, banks 0 and 1 of cache memory 22. While awaiting a signal that the peripheral device 12 is ready to receive data, processor core 20 might perform other tasks. When the time comes to transfer the previously stored data to peripheral device 12, if the processor is currently working on way 1, data group B will be transferred to the peripheral device before data group A. If data group B arrives at the peripheral device 12, the peripheral device may then execute the pending process without having a complete set of data with which to operate.

This problem is solved with the introduction of a start code into the data being transferred into the peripheral device. A start code is a sequence of bits which is designated to represent a unique data set in memory, the data set being particularly relevant to either a pending operation, an operation which has recently executed, or an operation which is currently being executed. The start code is preferably two or more bits wide.

When the start code in one line of peripheral device memory exactly matches the start code contained in the other lines of peripheral device memory, the peripheral device is deemed to have the data required for a pending operation, and that operation is executed.

Figure 3:
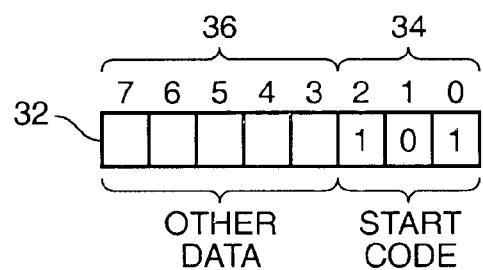
FIG. 3 is a block diagram representing the start code byte of from a typical line of data according to the present invention.

FIG. 3 is a block diagram representing the start code byte of from a typical line of data according to the present invention.

Referring to FIG. 3, a byte of memory data 32 is presented which includes three bits comprising a start code 34, and other data 36. Although it is not necessary that the start code comprise three bits, three bits allows eight different choices for start codes, allowing for sufficient flexibility when choosing start codes but minimizes the number of bits that are reserved for start codes. As few as one bit may suffice for some applications, and as many as 8 bits or more may be used in others.

Other data 36 may comprise two or more bits designating how many lines of data are required to perform the operation which depends on the data, so that the peripheral will know when all data has arrived in peripheral memory. For example, if two bits are allocated to designate how many lines of data are required, and both bits are high, three lines of data are required for the pending operation. The peripheral device executes that pending operation after three lines of data having the same start code has arrived in peripheral device memory.

Figure 4:
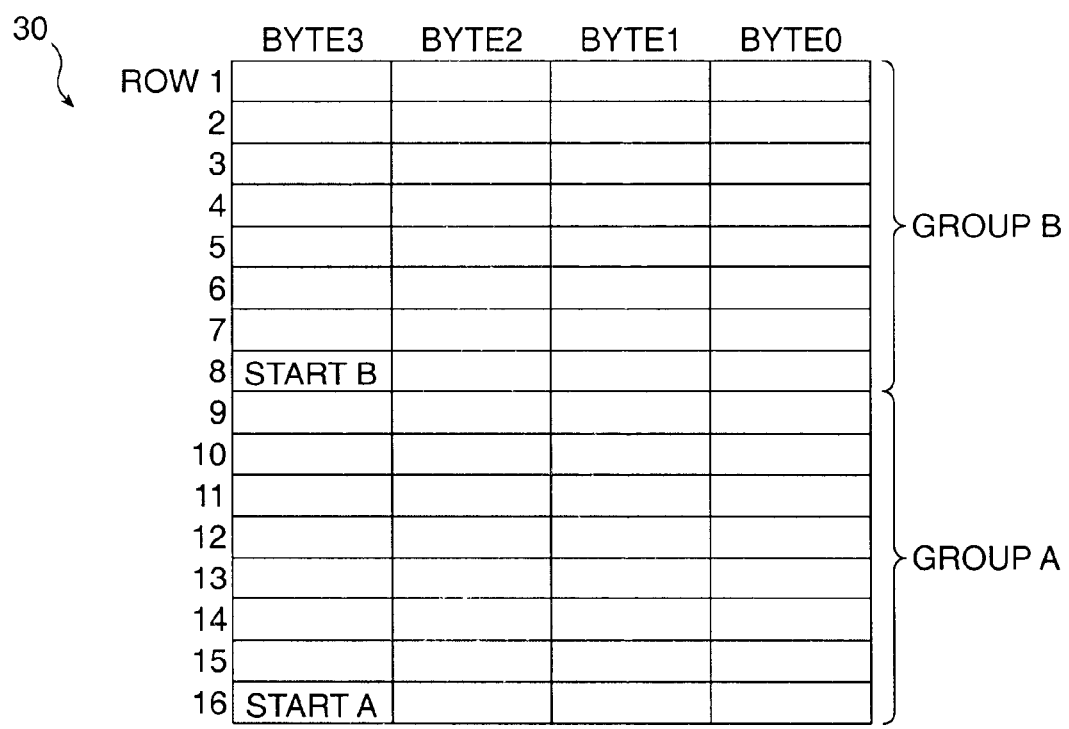
FIG. 4 is a block diagram showing one possible arrangement of the start code bytes with two 32-byte lines of data.

FIG. 4 is a block diagram showing one possible arrangement of the start code bytes with two 32-byte lines of data.

Referring to FIG. 4, an example is provided wherein two 32-byte lines of data are required for the peripheral device to have all of the data it needs to perform a given operation. In this example, a three-bit start code is used, and is placed as shown in column 3, row 8 (byte 32 of the entire line of data) for the first line of data, and in column 3, row 16 (byte 32 for the entire line of data) for the second line of data.

As can be seen from FIG. 4, group A arrived at the peripheral device later than group B. However, the execution of an instruction dependent upon group B for data will wait until the start code for groups A and B match.

Figure 5A:
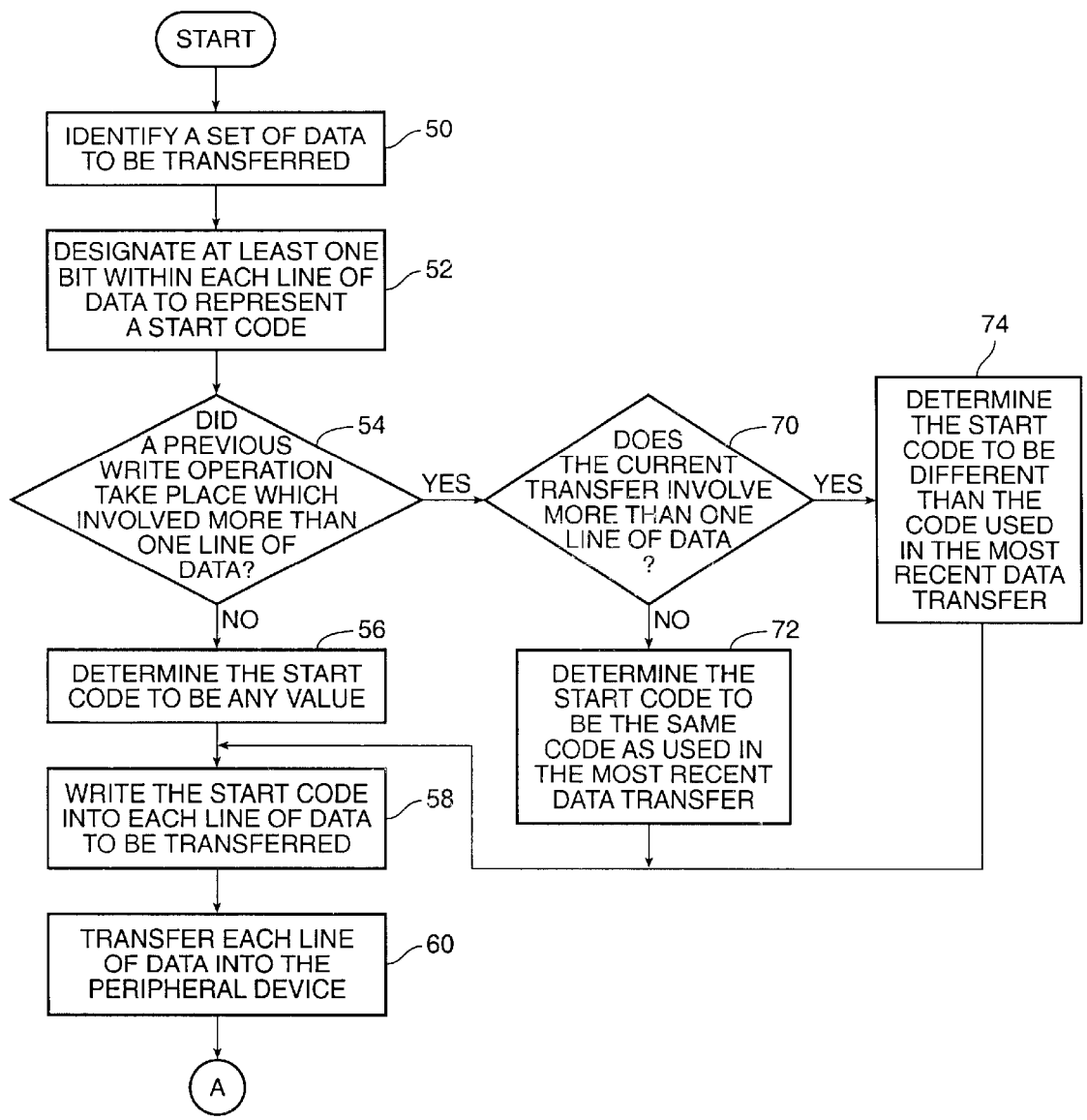
FIG. 5A and FIG. 5B together comprise a flow chart depicting a preferred method of the present invention.
Figure 5B:
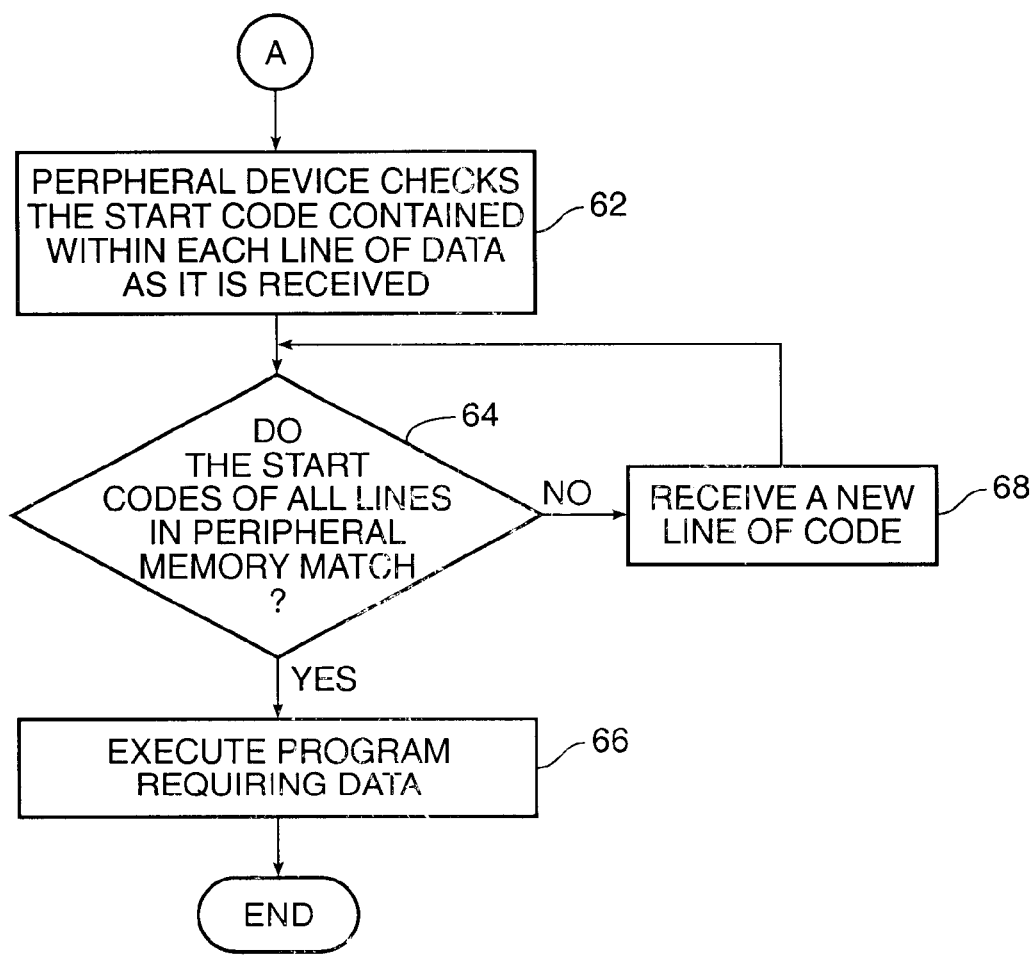

FIG. 5A and FIG. 5B together comprise a flow chart depicting a method of the present invention.

Referring to FIG. 5, at block 50 one or more lines of data which is to be routed through cache memory 22 before being transferred to a peripheral device is identified. It is not required that all required data be identified at one time. However, it is necessary that once the data is identified, a proper start code be assigned.

At block 52, the particular byte within each line of data where the start code will be placed is identified. Generally, this location will be determined one time, thus eliminating the need for this operation to be performed each time the present invention is practiced. For example, FIG. 4 shows the start code being placed in byte 32 of a given line of data.

At block 54, it is determined whether a previous operation has taken place with this peripheral device which involved more than one line of data in memory 30. If no, peripheral device memory is assumed to be free of extraneous data, and new data which arrives will pertain directly to the pending operation. Thus, any start code will suffice, so long as all lines of data have the same start code. The reason that there is no concern about previous operations which only utilized one line of data is that the pending operation will overwrite at least the first line of data in memory 30. Thus, the first line of data is of little consequence.

At block 56, it has been determined that any start code will suffice. Therefore, the start code byte of each line of data may be ignored, or may be set to any value, so long as the value chosen is the same for all lines of data.

At block 58 the start code is written into the lines of data, and at block 60 those lines of data are transferred into peripheral memory 30. At block 62, as each line of data is received by peripheral device 12, the start code for the received data is checked, at block 64, against the start codes already in memory. If all lines of data required for the execution of the pending operation have arrived in memory 30, the method proceeds at block 66 with the execution of pending operations by the peripheral device.

If, at block 64 not all of the lines of data required for the pending operation are present in peripheral memory, the method proceeds at block 68 when new lines of data are received. The method then proceeds at block 64 again, to check to see if all required data has arrived in memory.

If, at block 54, a previous operation had taken place which used more than one line of data, the method proceeds at block 70, wherein it is determined if the pending operation requires more than one line of data. If not, the method of the present invention proceeds with block 72 where the incoming data may be assigned the same start code as that previously used for the multiple lines from the previous operation. By using the same start code, the peripheral device will recognize that the pending instructions which depend on that one line of data may be executed, since the start codes of all lines in memory will match. The operation will then only "look" at the one line of data. The method of the present invention then proceeds with block 58.

Alternatively, at block 54, a unique start code may be assigned to the one required line of data, provided the "other data" bits comprise the number of lines of data required for the pending operation, as previously described. In this case, the peripheral device will know when to execute the pending instruction based on the number of lines required being set at "1".

If at block 70, the transfer of data to the peripheral device involves multiple lines of data, the method proceeds at block 74 where a new start code is assigned to the incoming data. Following block 74, the method of the present invention proceeds with block 58 to completion.

Those of ordinary skill in the art readily recognize that the present invention may be practiced with many different types of memory and many different CPU's. The present invention, therefore, is not intended to be restricted to a Pentium CPU or to any specific memory type.

Those of ordinary skill in the art will readily recognize that steps 54, 70, 72 and 64 are optional, since the determination of whether all lines of data required for a pending operation are present in memory may be made by examining "other data" 36 (FIG. 4) to determine how many lines of data are required, and then counting the number of lines in memory having the correct start code. If the number of lines in memory having the correct start code matches the number in other data 36, the pending operation may be executed.

While illustrative embodiments and applications of this invention have been shown and described, it would be apparent to those skilled in the art that many more modifications than have been mentioned above are possible without departing from the inventive concepts set forth herein. The invention, therefore, is not to be limited except in the spirit of the appended claims.

What is claimed is:

1. A data processing apparatus comprising:
   a data bus;
   a first device coupled to said data bus, the first device transmitting data to and receiving data from other devices over said data bus; and
   a second device coupled to said data bus, said second device comprising:
      a memory;
      determining means for determining when all lines of data in memory have the same start code; and
      executing means coupled to said determining means, said executing means for executing commands contained within said lines of data when said determining means indicates that all lines of data within said memory contain an identical start code.

2. The data processing apparatus of claim 1 wherein said first device is a central processing unit.

3. The data processing apparatus of claim 1 wherein said second device is a graphics device.

4. The data processing apparatus of claim 1 wherein said second device is an audio device.

5. The data processing apparatus of claim 1 wherein said first device is a central processing unit and said second device is a graphics device.

6. The data processing apparatus of claim 1 wherein said determining means is a comparator.

7. The data processing apparatus of claim 1 wherein said executing means is a state machine.

8. The data processing apparatus of claim 1 wherein said executing means is a microprocessor.

9. In a computer system having a processor, at least one peripheral device, and at least two line storage spaces, each line assembly storage space capable of storing at least one line of data, a method for ensuring that data transfers from the at least two line assembly storage devices to a given peripheral device are complete prior to the peripheral device executing instructions responsive to the content of the data, the method comprising:
   identifying, prior to data being written into a line storage assembly device, a set of data to be written, the set of data comprising at least one line of data;
   designating a start code for each line of data within the set of data;
   writing said start code into each line of data;
   writing each line of data within the set of data into a line assembly storage space;
   writing each line of data comprising a start code to said peripheral device;
   causing the peripheral device to examine the start code within said at least one line of data, and if said start code matches the start code contained within all lines of data in the memory of the peripheral device, executing a process within the peripheral device which depends upon said lines of data.

10. The computer system of claim 9 wherein, within the method, said set of data comprises two lines of data.

11. The computer system of claim of claim 10 wherein, each of said lines of data within said set of data comprises 32 bytes.

12. The computer system of claim 10 wherein, within the method, said start code within each of said lines of data comprises three bits.

13. In a computer system having a processor, at least one peripheral device, and at least two line storage spaces, each line assembly storage space capable of storing at least one line of data, a method for ensuring that required data is present in peripheral device memory prior to the peripheral device executing instructions responsive to the content of the data, the method comprising:
   identifying, prior to data being written into a line storage assembly device, a set of data to be written, the set of data comprising at least one line of data;
   determining the number of lines of data in said set of data;
   designating a start code for each line of data within the set of data;
   writing said start code and said number of lines into each line of data;
   writing each line of data comprising a start code to said peripheral device;
causing the peripheral device to examine the start code and said number of lines within said at least one line of data, and execute an operation if said start code matches the start code contained within all lines of data, and if all of said lines of data are present in said peripheral memory.

* * * * *